Figure 1:
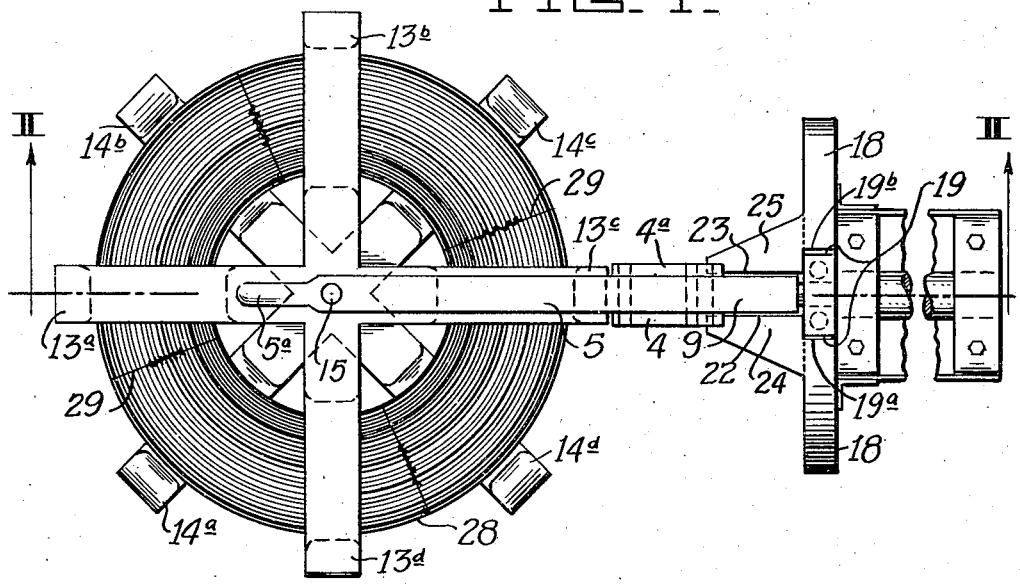

Aug. 22, 1944.　　　　J. M. ROITZ　　　　2,356,698
BUNDLE HANDLING MECHANISM FOR COILED MATERIAL
Filed Oct. 31, 1942　　　2 Sheets-Sheet 1

INVENTOR
JOSEPH M. ROITZ,
by John E. Jackson
his Attorney.

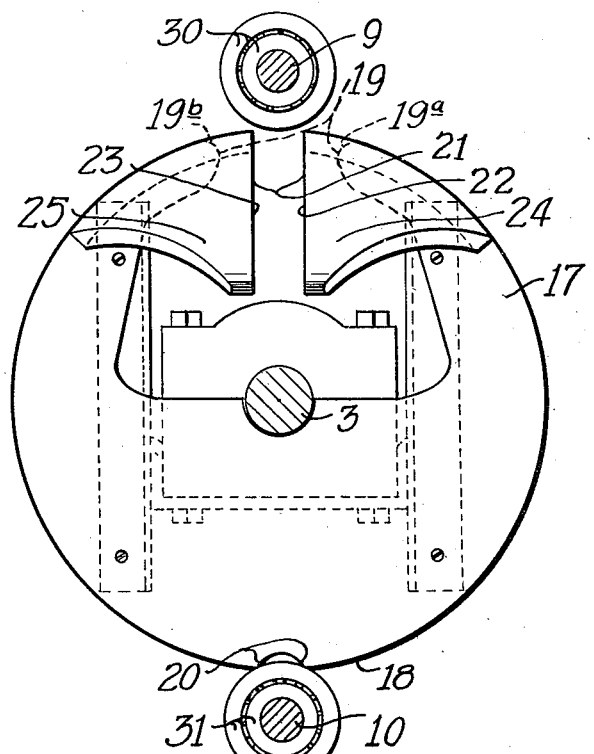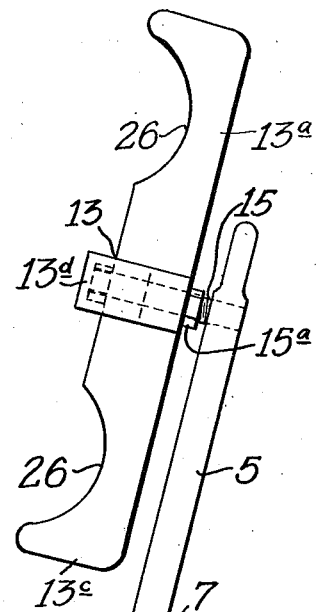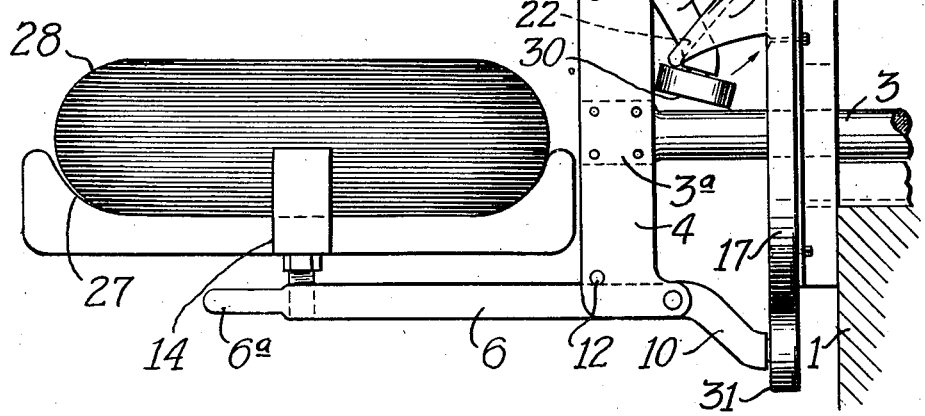

Patented Aug. 22, 1944

2,356,698

UNITED STATES PATENT OFFICE 2,356,698

BUNDLE HANDLING MECHANISM FOR COILED MATERIAL

Joseph M. Roitz, Cleveland, Ohio, assignor to The American Steel and Wire Company of New Jersey, a corporation of New Jersey Application October 31, 1942, Serial No. 464,096

9 Claims. (Cl. 214—1)

This invention relates generally to bundle handling mechanism, and more particularly relates to mechanism for conveniently handling and reversing bundles of coiled material, such for example as coiled wire, and particularly where such bundles of coiled material are relatively heavy, bulky and awkward to handle manually.

It is understood that while the immediate problem employing bundle handling and reversing mechanism for coiled material, has arisen in connection with the handling of bundles of coiled wire, where the bundles may vary in weight from 120 pounds to 280 pounds, and where the wire used in the manufacture of pneumatic automobile tire casings is of the order of 0.037 inch in diameter, such mechanism herein disclosed for conveniently handling and reversing such bundles, may be adapted for use and employed for handling bundles of coiled material composed of compositions and materials other than wire.

In the manufacture of wire, it is desirable to maintain a certain standard of quality of the wire that is coiled and shipped in bundles. To this end, one method of maintaining a check upon the strength composition and other properties of the wire, is to obtain a sample test specimen from each end of the bundle of coiled wire so that such sample test specimens of the wire may be tested. In view of the manner in which the bundle of the coiled wire is formed, the opposite ends of the bundle of coiled wire are on opposite sides of the bundle, so that one end is at the bottom of the bundle, and the other end is at the top of the bundle. This necessitates a turning or reversal of the bundle of coiled material in order to conveniently have access to the opposite ends of the wire constituting the coiled bundle. The sample test specimen of a wire is obtained by cutting or otherwise severing the desired length, which usually includes a number of coils or loops of the coiled wire, from each end thereof. Such sample test specimens may be subjected to mechanical or chemical tests, or both, as desired. It is necessary therefore that substantially the entire upper exposed area of the bundle of coiled material be readily accessible in order to remove the desired lengths or necessary number of coils of the wire, from each end. This requirement has a necessary relation to the character of the mechanism required for conveniently handling and reversing the relatively heavy and bulky bundle of coiled material with a minimum amount of effort and time of the operator.

While reference has been made to bundles of coiled material, it is understood that the mechanism may be adapted for use for purposes of inspection or otherwise, of articles, or for handling bundles or other articles which are not necessarily in a coiled condition, but which, for some particular reason, it is desirable to reverse the position of the same, and have ready access to the top and bottom, or opposite sides of said articles.

One of the objects of the present invention is to provide a means and mechanism for meeting the conditions and problem above set forth, whereby bundles of coiled material of relatively heavy weight, and which are awkward to handle, may be readily reversed in position, so that access may be had to opposite sides thereof in order to remove one or more coils of the material as sample test specimens.

The further object is to provide a reversible bundle handling mechanism including a two-part or a top and bottom frame member, so arranged and disposed that the same may be readily inverted in position, the arrangement being such that the top and bottom frame members are automatically retained in locked or bundle holding position, to prevent separation of the top and bottom frame members during the reversal in position; at the same time, the arrangement is such, that, when in any one of the two inverted positions, the top frame member may be readily raised and moved out of position so that the top of the coiled material may be readily and conveniently accessible for the removal by cutting or otherwise, of one or more of the coils or loops of the material.

A further object is to provide a reversible bundle handling material with the parts so disposed and arranged, that the bottom supporting and holding portion of the reversible frame is held in position against accidental reversal or movement of the frame while the top frame portion is in raised position.

A further object is to provide a reversible bundle handling mechanism in which the parts are so arranged and disposed that when the top and bottom frame members are in a closed bundle holding and retaining position, the frame and the enclosed bundle may be rotated about a horizontal axis of support so that during such movement of reversal, the frame members are locked in bundle holding relation.

Figure 1 is a top plan view showing the bundle of coiled material supported and held within the frame, the upper and lower frame members being in closed bundle holding position just prior to raising or lifting of the top frame member to permit access to the upper side of the coiled material for removal of one or more coils of the material as a sample test specimen.

Figure 2:
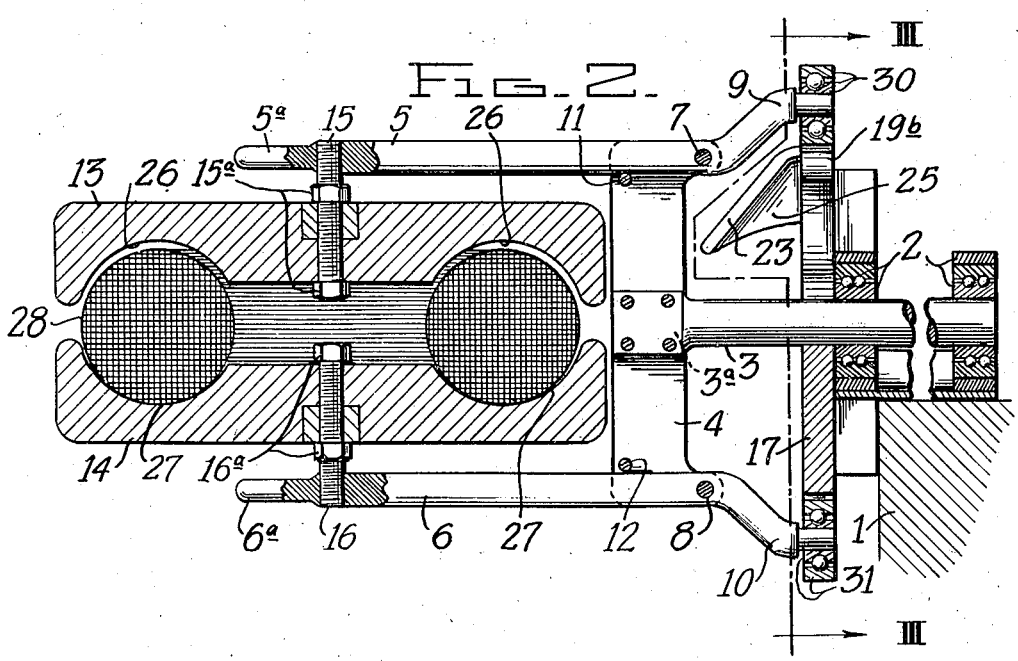

Figure 2 is a vertical broken sectional view taken on the line and looking in the direction of the arrows II—II of Figure 1; the view is not a true full section taken on the axial line but merely shows certain parts in section, and other parts in elevation, for purposes of clearness in representing the relative arrangement and relation in parts. As shown, the coiled material, the top and bottom frame members, a fragment of the upper and lower arm members cooperating with the respective frame members together with the pivotal point of support for said arms, and the stationary disk-like member which guides and determines the position of the ends of the arms, are the principal parts which are indicated in section. Other parts associated with the support and the rotary mounting are indicated in section, which latter parts will hereinafter be more fully identified.

Figure 3 is a view partly in section, taken on the broken line and looking in the direction of the arrows III—III of Figure 2.

Figure 4 is an elevation view in a number of respects quite similar to Figure 2 but showing the top frame member in open or raised position to afford access to the top side of the bundle of coiled material supported on the lower or bottom frame member. This view also illustrates the relative arrangement of the parts and means whereby the center of gravity of the top frame member is shifted from one side to the other of the pivotal point of support to assume a stable opened position when in raised position, and also indicates the manner in which the offset portion of the arm cooperating with the top frame member is nested between the back frame member and the disk-like guide, and the angularly disposed guide associated with the disk member which prevents accidental movement or rotation of the frame while the top frame is in open raised position, or during movement of such top frame member from its closed position to its opened raised position.

As shown in the drawings, a shaft support 3 is shown rotatably supported on a suitable support 1, which may be of any suitable character, conveniently located and disposed, by means of bearings 2, which bearings in turn may be of any suitable character or type, and disposed in any manner well known in the art in order to properly support the load and reduce the friction of the load carried at the end of the rotatable shaft support 3. As indicated, the bearings 2 are shown as ball bearings and are suitably spaced along the rotatable support 3 upon the support 1. The support 1 may be either a stationary base or table, or if the occasion and convenience requires, may be a suitable base or stand which may be mounted on a movable or portable truck or vehicle, if desired.

As shown, one end of the shaft support 3 extends outward beyond its point of bearing support and is provided with what might be termed a back support 4, 4a which serves as a means for supporting and spacing top and bottom members designated generally as 13 and 14, which comprise the main frame for holding the bundle in position. The specific structure and arrangement of the top and bottom frame members may be variously disposed and arranged, but, as shown and described, the top member includes a top frame member 13 suitably connected to an arm 5 which is pivotally connected intermediate its ends at one end of the back support 4, at the pivotal point 7, which pivotal connection may be of a pin type, or other suitable type well known to those skilled in the art. The end of the arm 9 is offset in a direction to increase the distance from the horizontal axis passing through the shaft support 3 which is rotatably mounted. The end of the offset portion 9 is disposed in cooperative guided relation with a disk-like circular support and guide 17, which guide, and cooperative relation between the parts will hereinafter be more fully set forth.

As shown, the connection between the upper frame member 13 and the arm 5 is obtained by means of a screw 15, one end of which is shown threaded in the outer end of the arm 5 adjacent the handle 5a. The body portion of the screw or threaded member 15 extends through an aperture disposed centrally or axially of the upper frame member 13. The frame member is securely held in detachable, rotatable and adjustable relation on the threaded member 15 by means of the two nuts 15a. One of each of said nuts 15a is shown disposed on opposite sides of the frame member so that said frame may be held in either fixed or rotatable relation relative the arm 5. A further advantage of such feature is that it enables the frame to be rotated about its axial support to wind or unwind the coiled material, or to be adjusted to different positions to accommodate the character or size of the bundle held within the frame, or, said frame member may be readily removed either for purposes of repair, or for replacement by an upper frame member of a different size or type, dependent upon the paticular material and character of the bundle or article being handled in the frame. It is understood of course that other specific means may be employed for connecting the top arm and top frame member together, than the specific means herein disclosed, all such means being well known to those skilled in the art.

There may be occasions and conditions under which it may be desirable to form the top member as a single integral structure whereby the arm and the top frame member will comprise a single integral member without a provision of a specific means of adjustment of the frame member upon the outer end of the arm. In practice, it has been found convenient to form the top and bottom frame members of wood, as such a material contributes toward a light construction. It is understood of course that the frame members and other parts may be made of other suitable material such, for example, as iron, steel or alloys, either cast, rolled, or pressed.

As shown, the bottom member including the bottom frame 14 and the bottom arm 6, which is pivotally connected to the bottom portion of the back support 4 by a pin 8, is in substance similar in structure and arrangement of parts to the upper member. As a matter of fact, when the bundle within the frame is reversed, the upper and lower frame members of the structure are reversed, so that that portion which was before reversal considered to be an upper frame member, becomes, after reversal, the lower or bottom frame member; and likewise, that portion which was considered to be the lower or bottom frame member, becomes, after reversal, the top frame member, which is then capable of being lifted or raised to permit access to the top of the bundle.

Considering further the back supporting member 4, 4a as shown in Figures 1 and 2, such back supporting member includes a plurality of strips or plates 4 and 4a (see Figure 1), said plates being preferably secured to opposite sides of the flattened head portion 3a of the rotatable shaft support 3; any suitable means may be employed for connecting the strips 4 and 4a to the flattened head portion 3a such, for example, as by rivets, screws or by spot welding where metal is employed. If desired, suitable stop pins 11 and 12 (see Figure 2), may be employed to determine and limit the movement of the arms 5 and 6, respectively, when the frame members occupy a closed position. The stop pins 11 and 12 may either pass through or be disposed between the outer ends of the spaced back support members 4, 4a, so that said stop pins 11 and 12 serve to strengthen and reinforce the back support.

As shown in the preferred form in Figure 1, the top frame member, designated generally as 13, includes the four arms arranged at right angles to each other and designated as 13a, 13b, 13c, 13d. Such a structure may be readily formed of two pieces of material, such, for example, as two strips of wood, and a dovetail or other suitable splicing connection formed at the center of said members, so that such members may be fitted together so their upper and lower faces will assume the same plane. Here likewise, it is understood that various other specific structures and methods may be employed by those skilled in the art to form a frame member having the four arms.

The bottom frame member designated generally by the reference character 14, and including the arms 14a, 14b, 14c, and 14d, comprises a structure similar to that already described in considering the upper frame member 13. However, in assembling the upper and lower frame members 13 and 14 with relation to the arms 5 and 6, respectively, preferably, the upper and lower frame members are formed by moving the upper and lower frame members 13 and 14, respectively, so that the arms will assume a relative relation as shown in the top plan view of Figure 1, wherein the arms of the bottom frame 14 are angularly displaced in a horizontal plane substantially 45° from the arms of the top frame 13. Of course, the present invention is not limited to such specific relation of the arms, but this particular relation has been found to be convenient and satisfactory; other arrangements and relations may be employed.

It might be well to note at this point that, in Figure 2, the sectional representation of the lower frame member 14 does not represent the true and technically correct position in relation to the section line II—II of Figure 1, but this means of sectional representation has been shown for purposes of clearness and convenience, and in the interest of economizing on the number of views, without materially altering or modifying the character of the fundamental disclosure. As is obvious in Figure 1, the arm 14a of the bottom frame is angularly displaced from the arm 13a of the top frame by 45°.

As indicated in Figure 2, the arms of the bottom frame member 14 are provided with concave recesses 27, and the arms of the top frame member 13 are provided with similar concave recesses 26, said recesses 26 and 27 being of such a shape and size as to conform substantially to the shape and size of the upper and lower portion of the shape or surface contour of the bundle of coiled material 28 which is being handled. The loops or coils of the bundle of coiled material, such as wire, are usually held in position by a suitable number of binding or tie wires 29. The said tie wire includes substantially one or more tie wires which are wrapped around coiled material, the ends of said tie wire being twisted together, or secured in any suitable manner by a suitable fastening means.

One of the important features of the present disclosure is the means which serves as a control or master locking member to perform a plurality of functions, both during the period of reversal of the position of the bundle of coiled material, and also during the period when the top frame member is in raised position to permit access to the top of the bundle. Generally stated, such control means serves to fix and lock the top and bottom frame members in bundle carrying relation during the reversal in the position of the bundle and thus serves as a safety feature which prevents the accidental opening or separation of the top and bottom frame members. This feature enables the bundle of coiled material to be securely held in position during the reversing operation.

A second function performed by the control member, is one which serves as a supporting or positioning means for the lower arm and bottom frame member whereby said bottom frame member is securely held in position, with its relatively heavy load thereon, during the period in which the sample test specimen of the material is being removed from the top of the bundle of coiled material.

It may be stated that the control member determines and enables a third function to be readily performed, namely, that function of enabling the top frame member to be raised and moved upwardly, only when the entire frame apparatus is in a safe, definite and fixed position, so that in all other positions, it is impossible to move or raise the top frame member.

There is still a fourth function which might fairly be stated to be incident to and related to a structure and functional feature of the control member. This latter function might also fairly be characterized as a safety factor in that it precludes movement for possible rotation of the frame member during the period when the top frame member is open and in raised position, and also further precludes possibility of movement or rotation of the frame during the period in which the top frame is being moved from its raised position to its lowered or closed position or vice versa.

Having referred in general language to the various functions performed by the control member, the specific structure and means for effecting the above functions will now be more fully referred to. In general terms, the control member includes a circular disk-like member 17 which is spaced from the back support 4 and is shown disposed and supported in fixed position adjacent the support 1. Any suitable means may be provided for mounting the disk-like control member 17, in fixed relation relative to the support 1.

Referring more particularly to Figure 3, the guiding contour of the substantially circular disk-like member 17 will be more clearly apparent; the upper portion of the circumference and perimeter of the disk is interrupted and provides an open or spaced portion 19, which open or spaced portion is defined by the reference character 19a as the end portion at one side, and 19b as the end portion at the other side of the spaced aperture. Such spaced aperture, is of a size to permit passage therethrough of a roller 30 which might be considered as the race portion of a roller bearing identified generally as 30 which is mounted on the end of the offset arm portion 9 of the upper arm 5. Similar roller bearing portion 31 is mounted at the end of the offset arm portion 10 of the lower arm 6. As heretofore indicated, the offset arm portion 9 is in a direction which increases the distance between said arm portion and the central axis of the shaft support 3 about which the frame rotates; the term increase in distance being used with reference to the position of the main portion of the arm 5, or specifically with reference to the distance between the pivotal point 7, and the axis of the shaft support. In like manner, the end of the offset arm is offset in a manner similar to the upper offset portion 9, so that the end of the offset arm portion 10 is at a greater distance from the axis of the shaft support 3, than is the main portion of the arm 6 and the pivot point 8, from such axis.

One of the particular advantages in providing such offset arm portions as 9 and 10 for the arms 5 and 6, respectively, is that when the particular arm is in raised position, such, for example, as arm 5 as shown in Figure 4 where the upper frame member 13 is in raised position, the offset portion enables the center of gravity of the upper frame member, including the frame 13 and the arm 5, to be transferred from a position to the left of the pivot point 7 about which a frame member moves, to a vertical plane to the right of said pivot point 7, whereby the arm is retained in a stable opened position without the employment of any independent holding or fastening means. In the raised position as indicated in Figure 4, the roller bearing 30 is brought into contact with the back supporting member 4 which serves as a stop to limit the raised position of the top frame member. As the offset arm portion is moved from the position indicated in Figure 3, to the position indicated in Figure 4, said offset arm portion 9 moves through a radially and angularly disposed slot or passageway identified by the reference character 21 (see Figure 3), the sides of said passageway being defined by reference characters 22 and 23, which are formed by a plurality of wings or flaps identified as 24 and 25 (see Figure 3). The angularly disposed wing 24 (see Figure 4 and Figure 3), is disposed adjacent the end 19a at one end of the circumference of the disk-like member 17, said wing or flap member extending downwardly and toward the back supporting member 4 so as to form a partial bridging portion for the space between the disk-like member 17 and said back supporting member 4. In like manner, the wing or flap member 25 (see Figure 3), is disposed in a manner similar to the wing or flap 24 but is at a point adjacent the end 19b at the circumference of the disk-like portion 17, and at the opposite side of the interrupted circumferential portion, or spaced portion 19. It will now be apparent that the spaced portion 19 is sufficient to permit the roller portion 30 to be moved therethrough as the arm 5 is moved or raised from the position indicated in Figure 2, to the position indicated in Figure 4. It will now be clear that during such raising of the arm 5, the offset arm portion 9 will be moved through the passage or slot 21 between the side guiding portions 22 and 23 so that throughout this period of movement, or raising or lowering of the arm 5, any movement or rotation of the arm 9 about the horizontal axis of the shaft support 3, will be prevented so that any likelihood of the accidental sliding of the relatively heavy bundle of coiled material from the bottom supporting frame, due to accidental movement or revolving of the back frame 4 about the horizontal axis of the shaft support 3, is absolutely prevented. This is a safety factor of some importance which constitutes a very desirable feature of the present invention.

As shown in Figure 3, the roller bearing 31 mounted at the end of the offset arm portion 10 is positioned in a recess 20 of suitable form, which serves as a further stop or positioning means to retain the frame in stable position while the upper frame 5 is in raised position. Of course, it is understood that the particular form of anti-friction means interposed between the end of the offset arm portions, and the outer circumferential guiding portion of the disk-like member 17, is a feature which may be varied and changed as preference dictates, as it is clear that other types of anti-friction bearings may be employed, than the particular roller and ball bearing type herein shown and described. For example, it is possible that under certain conditions and for certain sizes and loads, a roller type of anti-friction bearing may be employed, and under other conditions it may be that a lubricant might be the main means employed for effecting an anti-friction bearing between the off-set arm portion and the circumferential guiding portion of the circular disk-like member 17.

Of course, it is clear from the disclosure above made, that during the reversal of the position of the bundle of coiled material contained and supported between the upper and lower frame members 4 and 5, the offset end portions 9 and 10 of the arms 5 and 6, respectively, will be in guided sliding relation with the outer circumference or periphery 18 of the circular disk-like member 17 so that it will be impossible to effect any relative movement between the top and bottom frame members 13 and 14 until the frame member has been brought to a position indicated in Figure 2. When the frame parts have been moved to assume a position indicated in Figure 2, the top frame may then be raised in a manner hereinbefore indicated. It is thus seen that by reason of the continuous circumferential guiding portion 18 of the disk-like member 17, functioning as a guiding portion for the end of the offset arm portions 9 and 10, respectively, an effective locking function is performed by such disk-like member which precludes the accidental separation of the top and bottom frame members during the period of reversal of the position of the bundle of coiled material.

While one preferred form has herein been shown and described for purposes of illustration, various changes and modifications may be made in detailed structure, and relative arrangement of parts, all within the knowledge of the person skilled in the art, without departing from the spirit and scope of this invention as defined in the following claims:

I claim:

1. Mechanism for handling bundles and reversing the position of said bundles, said mechanism including in combination a bundle carrying frame for the material, and frame reversing means arranged to enable said bundle carrying frame to be rotated about a substantially horizontal axis, said frame reversing means, including a back supporting member, and a shaft support for the mechanism rotatably mounted and providing an axis of rotation for said frame, one end of said shaft support being connected to said back member, a bearing for said shaft support disposed to support said relatively bulky and heavy bundle independent of other supporting means, said bundle carrying frame including a top and bottom member disposed respectively above and below the bundle of coiled material, and a plurality of arms, including a top and bottom arm, one end of each arm being connected with the top and bottom member respectively, each of said arms having a pivotal connection with said back supporting member, and including, frame member control means for determining the relative position and relation of the top and bottom members of the frame, said frame member control means including, a stationary guide member cooperating with the pivoted top and bottom members of the frame, said guide member including, a substantially circular disk-like member the periphery of which cooperates with the hinged top and bottom members of the frame during rotation of the frame to prevent separation or relative movement between said hinged top and bottom members of the frame to retain the top and bottom frame members in closed or locked relation, said guide member including a stop position at one portion of its periphery adapted to serve as a positioning stop seat to fix the position of the bottom frame member and prevent further accidental rotation of said frame, said disk-like guide member also having an interrupted or open portion in its guiding peripheral portion, and an open unobstructed radially disposed passage in alignment with said open peripheral portion adapted to permit the cooperating guiding portion for the upper frame member to be moved through said peripheral interrupted portion and said radially disposed passage, when the upper frame is moved upward to permit access to the bundle supported on the bottom frame member, said arms supporting the top and bottom frame members respectively, having a pivotal connection with the back supporting member at a point intermediate the ends of said arms, whereby one end of said frame supporting arm projects beyond said back supporting member, the end of said projecting arm being disposed in cooperative guided relation with the periphery of said circular disk-like member, during the rotation of the frame.

2. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft and having confronting article engaging portions at their forward ends whereby the article engaging portions thereof may approach and may be moved away from each other, and means cooperating with the rearwardly extending portions of th article holding arms to hold them in article engaging position while they are being rotated about the axis of said shaft.

3. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the arms may approach and may be moved away from each other, confronting article engaging members attached to the forward ends of the arms for holding article therebetween, and means cooperating with the rearwardly extending portions of th article holding arms to hold them in article engaging position while they are being rotated about the axis of said shaft.

4. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the arms may approach and may be moved away from each other, confronting article engaging members adjustably attached to the forward ends of the arms whereby the spacing between such members when the arms are in article supporting position may be altered, and means cooperating with the rearwardly extending portions of the arms to hold them in article engaging position while they are being rotated about the axis of said shaft.

5. Mechanism for supporting articles and allowing their reversal while so supported, said mechanism including in combination a horizontal shaft, a support for said shaft, a bearing between the shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the article engaging portions thereof may approach and may be moved away from each other, and guide means so constructed and arranged as to cooperate with the rearwardly extending portions of the article holding arms to hold them together in article engaging position while they are being rotated about the axis of said shaft and to allow one of said arms to be swung clear of said article when said device has been turned to a loading and unloading position.

6. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the article engaging portions thereof may approach and may be moved away from each other, and guide means providing surfaces substantially coaxial with the axis of the shaft cooperating with the rearwardly extending portions of the article holding arms to hold them together in article engaging position while they are being rotated about the axis of said shaft, said guide means being provided at one position with a slot to receive the rearward portion of an arm at that position whereby said arm may be swung clear of the article.

7. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the article engaging portions thereof may approach and may be moved away from each other, and guide means providing surfaces substantially coaxial with the axis of the shaft cooperating with the rearwardly extending portions of the article holding arms to hold them together in article engaging position while they are being rotated about the axis of said shaft, said guide means being provided at one position with a slot to receive the rearward portion of one of the arms whereby said arm may be swung clear of the article, said guide means being provided with a depression at a position substantially opposite the slot to receive the rearwardly extending portion of the other arm and thus restrain the article holding mechanism from turning.

8. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the article engaging portions thereof may approach and may be moved away from each other, guide means providing surfaces substantially coaxial with the axis of the shaft cooperating with the rearwardly extending portions of the article holding arms to hold them together in article engaging position while they are being rotated about the axis of said shaft, said guide means being provided at one position with a slot to receive the rearward portion of one of the arms whereby said arms may be swung clear of the article, and means positively to lock the mechanism from turning when the article engaging arm is swung clear of the article.

9. Mechanism for supporting articles and allowing their reversal while so supported, said mechanism including in combination a horizontal shaft, a support for said shaft, a bearing between said shaft and said support allowing the rotation of the shaft about its axis, one end of said shaft projecting a substantial distance from the bearing, a member affixed to the projecting end of the shaft and extending substantially transversely thereof, two article carrying arms pivoted intermediate their ends to the said transverse member on opposite sides of the shaft whereby the article engaging portions thereof may approach and may be moved away from each other, guide means providing surfaces substantially coaxial with the axis of the shaft cooperating with the rearwardly extending portions of the article holding arms to hold them together in article engaging position while they are being rotated about the axis of said shaft, said guide means being provided at one position with a slot to receive the rearward portion of one of the arms whereby said arms may be swung clear of the article, and wing members extending from said guide means on each side of said slot and substantially parallel thereto to allow the rearwardly extending portion of the article holding arm to be received therebetween and thereby to lock the mechanism from turning when the forward portion of such arm is swung clear of the article.

JOSEPH M. ROITZ.